United States Patent
Bourdelais et al.

(10) Patent No.: US 6,831,786 B2
(45) Date of Patent: Dec. 14, 2004

(54) SURFACE FORMED COMPLEX MULTI-LAYERED POLYMER LENSES FOR LIGHT DIFFUSION

(75) Inventors: Robert P. Bourdelais, Pittsford, NY (US); Cheryl J. Kaminsky, Rochester, NY (US); Steven J. Neerbasch, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/095,145

(22) Filed: Mar. 11, 2002

(65) Prior Publication Data

US 2003/0169499 A1 Sep. 11, 2003

(51) Int. Cl.⁷ .................................................. G02B 5/02
(52) U.S. Cl. ........................ 359/599; 359/619; 359/628
(58) Field of Search ................................. 359/599, 707, 359/619, 620, 621, 622, 623, 624, 625, 626, 627, 628, 455; 322/20; 250/216

(56) References Cited

U.S. PATENT DOCUMENTS

| | | | | |
|---|---|---|---|---|
| 5,183,597 A | * | 2/1993 | Lu | 264/1.38 |
| 5,536,627 A | * | 7/1996 | Wang et al. | 430/523 |
| 5,756,245 A | * | 5/1998 | Esteghamatian et al. | 430/58.8 |
| 5,995,288 A | * | 11/1999 | Kashima et al. | 359/599 |
| 6,039,452 A | * | 3/2000 | Iimura | 362/31 |
| 6,067,137 A | * | 5/2000 | Ohnishi et al. | 349/112 |
| 6,266,476 B1 | | 7/2001 | Shie et al. | 385/147 |
| 6,270,697 B1 | | 8/2001 | Myers et al. | 264/1.34 |
| 6,317,263 B1 | * | 11/2001 | Moshrefzadeh et al. | 359/443 |
| 6,330,112 B1 | * | 12/2001 | Kaise et al. | 359/621 |
| 2002/0028340 A1 | * | 3/2002 | Fujii et al. | 428/516 |

\* cited by examiner

*Primary Examiner*—Drew A. Dunn
*Assistant Examiner*—Joshua L Pritchett
(74) *Attorney, Agent, or Firm*—Arthur E. Kluegel (57) ABSTRACT

Disclosed is an integral film comprising a base bearing a pattern of complex lenses on a surface thereof wherein the complex lenses comprise two or more distinct layers.

63 Claims, 2 Drawing Sheets

SURFACE FORMED COMPLEX MULTI-LAYERED POLYMER LENSES FOR LIGHT DIFFUSION

CROSS REFERENCE TO RELATED APPLICATIONS

This application is one of a group of seven applications co-filed under Ser. Nos. 10/095,204, 10/095,601, 10/095,145, 10/095,172, 10/095,319, 10/094,977 and 10/094,979.

FIELD OF THE INVENTION

The invention relates to a transparent polymeric film comprising a base bearing a pattern of complex lenses on a surface thereof wherein the complex lenses comprise two or more distinct layers, the film being useful as a diffuser for specular light.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from a major drawback: the need for air contact. The requirement that the rough surface must be in contact with air to operate properly may result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where a surface diffuser may be desirable, where the bulk type of diffuser would not be appropriate. For example, the surface diffuser can be applied to an existing film or substrate thus eliminating the need for a separate film. In the case of light management in a LCD, this increases efficiency by removing an interface (which causes reflection and lost light).

In U.S. Pat. No. 6,270,697 (Meyers et al.), blur films are used to transmit infrared energy of a specific waveband using a repeating pattern of peak-and-valley features. While this does diffuse visible light, the periodic nature of the features is unacceptable for a backlight LC device because the pattern can be seen through the display device.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. The materials disclosed in U.S. Pat. No. 6,266,476 shape and collimate light, and therefore are not efficient diffusers of light particularly for liquid crystal display devices.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

U.S. Pat. No. 6,087,079 relates to utilizing co-extrusion of multiple layers of polymers to provide adhesion of biaxially oriented polymer sheets to paper for use as a photographic base material.

U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger et al) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

PROBLEM TO BE SOLVED BY THE INVENTION

There remains a need for an improved light diffusion of image illumination light sources to provide improved diffuse light transmission while simultaneously diffusing specular light sources.

SUMMARY OF THE INVENTION

The invention provides a diffuser film comprising a base bearing a pattern of convex or concave complex lenses on a surface thereof wherein the complex lenses comprise two or more distinct layers. The invention also provides a light diffuser for backlighted imaging media, a liquid crystal display component and device, and a method of making the diffuser film.

ADVANTAGEOUS EFFECT OF THE INVENTION

The invention provides improved light transmission while simultaneously diffusing specular light sources.

DETAILED DESCRIPTION OF THE INVENTION

The invention has numerous advantages over prior practices in the art. The invention provides diffusion of specular light sources that are commonly used in rear projection display devices such as liquid crystal display devices. Further, the invention, while providing diffusion to the light sources, has a high light transmission rate. A high transmission rate for light diffusers is particularly important for liquid crystal display devices as a high transmission value allows the liquid crystal display to be brighter or the same brightness with extended the life of the battery. Holding the level of brightness the same allows for the power consumption of the back light to be reduced therefore extending the lifetime of battery powered liquid crystal devices that are common for note book computers. The surface lenslet structure polymer layer of the invention can be easily changed to achieve the desired diffusion and light transmission requirements for many liquid crystal devices thus allowing the invention materials to be responsive to the rapidly changing product requirements in the liquid crystal display market.

The complex lenses of the invention, used to diffuse light, are formed with several layers of polymers. By forming the lenses with more than one layer, each layer a have separate functionality compared to a mono-layered complex lenses. The multiple layered complex lenses can be improved over a mono-layered lens by providing a hard polymer on the surface improving scratch resistance, changing the index of refraction of the layers allows for more efficient diffusion of transmitted light and bonding layers to bond the complex lenses to the base materials of the invention. Further, the multiple layered lens can contain addenda to improve the functionality of the light diffuser.

The multiple layered complex of the invention can also be utilized to improve release from the patterned roll, thereby improving the replication and quality of the lenses. By providing a multiple layered complex lens, the manufacturing efficiency for the complex lenses is improved by providing thin skin and bonding layers that are easily melt extrudable and a core that has been optimized for optical properties.

The elastic modulus and scratch resistance of the diffuser is improved over prior art cast coated polymer diffusers rendering a more robust diffuser during the assembly operation of the liquid crystal device. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo- and co-polymers. The term "average", with respect to lens size and frequency, means the arithmetic mean over the entire film surface area.

"Transparent" means a film with total light transmission of 50% or greater at 500 nm. "In any direction", with respect to lenslet arrangement on a film, means any direction in the x and y plane parallel to the base. The term "pattern" means any predetermined arrangement of lenses whether regular or random.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters is desired for each application.

The back diffuser is placed directly in front of the light source and is used to even out the light throughout the display by changing specular light into diffuse light. The diffusion film is made up of a plurality of lenslets on a web material to broaden and diffuse the incoming light. Prior art methods for diffusing LCD back light include layering polymer films with different indexes of refraction, micro-voided polymer film, or coating the film with matte resins or beads. The role of the front diffuser is to broaden the light coming out of the liquid crystal (LC) with directional selectivity. The light is compressed into a tight beam to enter the LC for highest efficiency and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means also achieve this directionality. The diffusion film of the present invention can be produced by using a conventional film-manufacturing facility in high productivity.

The polymeric diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets which the minor lenses are formed randomly on top of. "Minor lenses" mean lenses smaller than the major lenses that are formed on the major lenses. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, off-set from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, meaning that the direction of the peak light transmission is not along the direction θ=0°, but is in a direction non-normal to the surface. There are at least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

The complex lenses of the invention preferably comprise between 2 and 11 layers. By providing multiple layered lenses, index of refraction changes between layers can be achieved, improving the diffusion efficiency of the multiple layered complex lenses compared to a complex lens comprising one layer. The increase in diffusion efficiency is proportional to the index of refraction changes and can range from a 3% improvement to a 23% improvement in diffusion efficiency. Complex lenses of the invention made with 12 or more layers are difficult to manufacture and have been sown to reduce the curvature of the complex lens reducing visible light diffusion. More preferably, the complex lenses comprise between 2 and 5 layers. A complex lens with five layers has been shown to significantly improve visible light diffusion compared to a single layered complex lens and can be manufactured using a co-extruded melt stream of polymer.

In a preferred embodiment of the invention, the complex lenses have three distinct layers. The three layer system is preferred as the top most layer can be made hard to resist scratching, the center layer can be used to provide optimum optical transmission and the bottom most layer for the multi-layered complex lanes can be used as an adhesion layer to the base material.

The multi-layered complex lens of the invention preferably has distinct layers with an index of refraction difference between 0.04 and 0.70. Index of refraction changes between the layers has been shown to improve visible light diffusion of the complex lens. An index of refraction difference less than 0.02 has been shown to provide small improvement in light diffusion efficiency. Index of refraction differences between layers greater than 0.60 are to achieve given the current state of materials science. More preferably, the index of refraction difference between the layers is between 0.05 and 0.20. This index of reflection difference has been shown to improve diffusion efficiency approximately 10% and can be achieved by using different melt extrudable polymers with the index of refraction difference.

The preferred index of refraction difference between adjacent layers is preferably between 0.05 and 0.20. This index of refraction difference between adjacent layers has been shown to provide optimum diffusion of visible light as the index of refraction difference between the layers provides visible light diffusion between the layers before the transmitted light energy exits the complex lenses to ambient conditions, typically air.

The complex lenses of the invention preferably comprise multiple layers that are between 3 and 50 micrometers in thickness. A layer less than 2 micrometer is difficult to achieve in manufacturing and can cause unwanted optical interference patterns since the thickness is less than the wave length of light. Layer thickness greater than 60 micrometers has been shown to reduce the curvature of the lenses by reducing the ability to replicate the complex lens surface as lens layer thickness is inversely proportional to the replication of the lens geometry. More preferably, the thickness of the complex lens layers are between 5 and 20 micrometers. Between 5 and 20 micrometers, unwanted optical interference patterns are avoided and the thickness of the layers allows for multiple layers to be used without significantly reducing the curvature of the lenses.

In another preferred embodiment of the invention, the complex lenses comprises a substantially thick layer having a thickness between 10 and 50 micrometers encapsulated by two thin layers having a thickness of between 3 and 8 micrometers. The thin skin layers, that is the top and bottom layers of the complex lens are thin to provide lens smoothness, lens hardness and adhesion to the base. The substantially thick layer with a thickness of between 10 and 50 micrometers comprises the bulk of the lens and is used to provide index of refraction difference between the ambient environment and the skin layers for the diffusion of visible light.

The multi-layered complex lens of the invention preferably comprises a outermost, or skin layer, that has a hardness of between 0.30 and 0.85 GPa. This hardness range provides resistance to scratching and mechanical compression of the lenses during assembly and use of LC devices, for example. Hardness less than 0.20 GPa has been shown to scratch and therefore does not offer enough protection. Hardness greater than 1.0 GPa does not provide any additional protection and therefore is not cost justified. Hardness of the multi-layered lens can be achieved by utilizing a highly crystalline polymer, or by providing a hard coating of polyurethane polymer to the surface of the complex lenses.

The multi-layered complex lenses of the invention preferably comprise an outer layer having a surface energy of between 26 and 42 dynes/cm2. Surface energy in this range provides an opportunity to provide additional coatings such as scratch resistant coatings and antistat coatings. The surface energy in this range also allows for printing of the diffuser sheet around the perimeter of the sheet to better focus transmitted light to the center of the LC device.

The multi-layered complex lens of the invention preferably comprises a polymer layer adjacent to the base with a Tg of between 75 and 125 degrees C. By providing a polymer with a Tg of between 75 and 125 degrees C., complex adhesion to the base materials that are difficult to adhere melt extruded polymer such as polyester, polycarbonate and polypropylene, which are significantly improved for complex lens adhesion compared to polymers with a Tg greater than 135 degrees C.

The complex lens of the invention preferably comprises a layer adjacent to the base materials with a peel strength greater than 40 grams/cm. It has been found that complex peel strengths to the base of less than 30 grams/cm often delaminate during environmental extremes encountered by LC devices. Extremes such as note book computers that are stored in a car during hot summer months where the temperature can reach 75 degrees C. Another example is two or more back lighting sources typically used for LC television. The two light sources typically generate heat in the 60 to 75 degrees C. range and can cause delaminating of the complex lenses unless the peel strength is greater than 60 grams/cm.

A transparent polymeric film having a top and bottom surface comprising a plurality of convex or concave complex lenses on the surface of the transparent polymeric film is preferred. Curved concave and convex polymer lenses have been shown to provide very efficient diffusion of light. Further, the polymer lenses of the invention are transparent, enabling a high transmission of light and allowing LC displays to emit more light.

The concave or complex lenses on the surface of the polymer film are preferably randomly placed. Random placement of lenses increases the diffusion efficiency of the invention materials. Further, by avoiding a concave or convex placement of lenses that is ordered, undesirable optical interference patterns are avoided.

In an embodiment of the invention, the concave or convex lenses are located on both sides of the transparent polymer sheet. By placing the lenses on both sides of the transparent sheet, more efficient light diffusion is observed compared to the lenses of the invention on one side. Further, the placement of the lenses on both sides of the transparent sheet increases the focal length of the lenses furthest from the brightness enhancement film in a LC display device.

In one embodiment of the invention, convex lenses are present on the top surface and convex lenses are present on the bottom surface of the transparent polymeric film. The placement of convex lenses on both sides of the polymer film creates stand off from other adjacent films providing the necessary air gap required for efficient diffusion by the lenses.

In another embodiment of the invention, convex lenses are present on the top surface and concave lenses are present on the bottom surface of the transparent polymeric film. The placement of convex lenses on the top side of the polymer film creates stand off from other adjacent films providing the necessary air gap required for efficient diffusion by the lenses. The placement of concave lenses on the bottom side of the polymer film creates a surface that can be in optical contact with the adjacent films and still effectively diffuse the light.

In another embodiment of the invention, concave lenses are present on the top surface and concave lenses are present on the bottom surface of the transparent polymeric film. The placement of concave lenses on both sides of the polymer film creates a surface that can be in optical contact with the adjacent films on either side and still effectively diffuse the light.

In another embodiment of the invention, concave lenses are present on the top surface and convex lenses are present on the bottom surface of the transparent polymeric film. The placement of concave lenses on the top side of the polymer film creates a surface that can be in optical contact with the adjacent films and still effectively diffuse the light. The placement of convex lenses on the bottom side of the polymer film creates stand off from other adjacent films providing the necessary air gap required for efficient diffusion by the lenses.

Preferably, the concave or convex lenses have an average frequency in any direction of from 4 to 250 complex lenses/mm. When a film has an average of 285 complex lenses/mm, creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The preferred transparent polymeric film has concave or convex lenses at an average width between 3 and 60 microns in the x and y direction. When lenses have sizes below 1 micron the lenses impart a color shift in the light passing through because the lenses dimensions are on the order of the wavelength of light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion.

The concave or convex complex lenses comprising minor lenses wherein the diameter of the smaller lenses is preferably not more than 80%, on average, the diameter of the major lens. When the diameter of the minor lens exceeds 80% of the major lens, the diffusion efficiency is decreased because the complexity of the lenses is reduced.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light. When the minor lenses have sizes above 25 microns, the diffusion efficiency is decreased because the complexity of the lenses is reduced. More preferred are the minor lenses having a width in the x and y direction between 3 and 8 microns. This range has been shown to create the most efficient diffusion.

Preferably, the concave or convex complex lenses comprise an olefin repeating unit. Polyolefins are low in cost and high in light transmission. Further, polyolefin polymers are efficiently melt extrudable and therefore can be used to create light diffusers in roll form.

In another embodiment of the invention, the concave or convex complex lenses comprise a carbonate repeating unit. Polycarbonates have high optical transmission values that allows for high light transmission and diffusion. High light transmission provides for a brighter LC device than diffusion materials that have low light transmission values.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the polymeric support comprises an ester repeating unit. Polyesters are low in cost and have good strength and surface properties. Further, polyester polymer film is dimensionally stable over the current range of temperatures encountered in enclosed display devices. Polyester polymer easily fractures allowing for die cutting of diffuser sheets for insertion into display devices.

In another embodiment of the transparent polymeric film, the polymeric support comprises a carbonate repeating unit. Polycarbonates have high optical transmission values compared to polyolefin polymers and therefore can improve the brightness of display devices.

In another embodiment of the invention, the polymeric support comprises an olefin repeating unit. Polyolefins are low in cost and have good strength and surface properties.

In another embodiment of the invention the polymeric support comprises a cellulose acetate. Tri acetyl cellulose has both high optical transmission and low optical birefringence allowing the diffuser of the invention to both diffuse light and reduce unwanted optical patterns.

The preferred diffuse light transmission of the diffuser material of the invention is greater than 50%. Diffuser light transmission less than 45% does not let a sufficient quantity of light pass through the diffuser, thus making the diffuser inefficient. A more preferred diffuse light transmission of the lenslet film is at least 80 typically from 80 to 95%. An 80% diffuse transmission allows an LC device to have improved battery life and increased screen brightness. The most preferred diffuse transmission of the transparent polymeric film is at least 92%. A diffuse transmission of 92% allows diffusion of the back light source and maximizes the brightness of the LC device significant improving the image quality of an LC device for outdoor use where the LC screen must compete with natural sunlight.

Preferably, the concave or convex lenses are semispherical meaning that the surface of each lenslet is a sector of a sphere, but not necessarily a hemisphere. This provides excellent even diffusion over the x-y plane. The semispherical shaped lenses scatter the incident light uniformly, ideal for a backlit display application where the display area needs to be lit uniformly.

In another embodiment of the invention, the concave or convex lenses are aspherical meaning that width of the lenses differ in the x and y direction. This scatters light selectively over the x-y plane. For example, a particular x-y aspect ratio might produce an elliptical scattering pattern. This would be useful in the front of a LC display, spreading the light more in the horizontal direction than the vertical direction for increased viewing angle.

The convex or concave lenses preferably have a height/diameter ratio of from 0.03 to 1.0. A height/diameter ratio of less than 0.01 (very wide and shallow lenses) limits diffusivity because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of from 0.25 to 0.48. It has been found that the most efficient diffusion occurs in this range.

The number of minor lenses per major lens is preferably from 2 to 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred is from 5 to 18 minor lenses per major lens. This range has been shown to produce the most efficient diffusion.

The thickness of the transparent polymeric film preferably is not more than 250 micrometers or more preferably from 12.5 to 50 micrometers. Current design trends for LC devices are toward lighter and thinner devices. By reducing the thickness of the light diffuser to not more than 250 micrometers, the LC devices can be made lighter and thinner. Further, by reducing the thickness of the light diffuser, brightness of the LC device can be improved by reducing light transmission. The more preferred thickness of the light diffuser is from 12.5 to 50 micrometers which further allows the light diffuser to be convienently combined with a other optical materials in an LC device such as brightness enhancement films. Further, by reducing the thickness of the light diffuser, the materials content of the diffuser is reduced.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to withstand the rigors of the assembly process compared to prior art cast diffusion films which are delicate and difficult to assemble.

Figure 1:
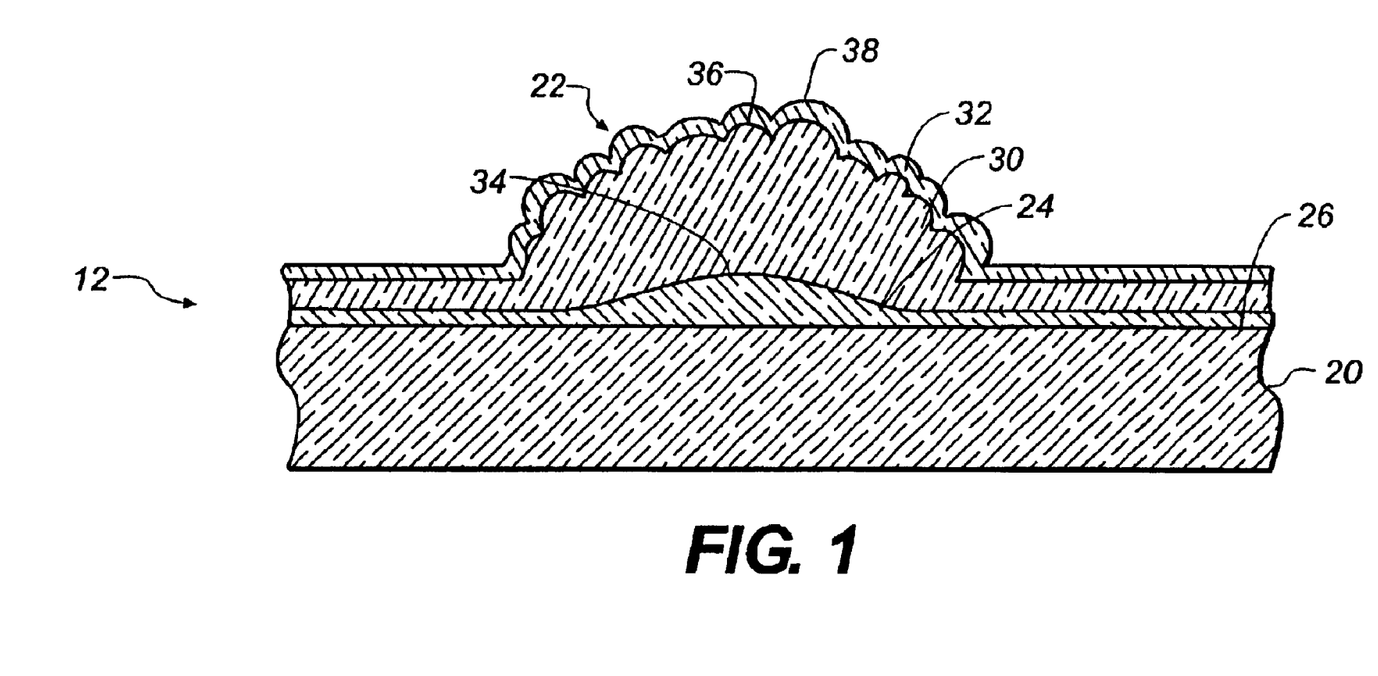
FIG. 1 illustrates a cross section of a complex lens containing three distinct polymer layers formed on a transparent base material suitable for use in a liquid crystal display device.

FIG. 1 illustrates a cross section of a multiple layered complex lens formed on a transparent base material suitable for use in a liquid crystal display device. Light diffusion film 12 comprises base 20, onto which major lens 22 is applied to the surface of base 26. The major lens 22 consists of three distinct layers 24, 30 and 32 which comprise the major lens 22. Bottom layer 24 is the layer next to the base 20. Middle layer 30 is on top of bottom layer 24 and below top layer 32. Top layer 32 is on the top of middle layer 30. The invention comprises a plurality of minor lenses 34, 36 and 38 on the surfaces of layers 24, 30, and 32, respectively. The light diffuser of the invention contains many diffusion surfaces from major lens 22 and the minor lenses 34, 36, and 38.

Figure 2:
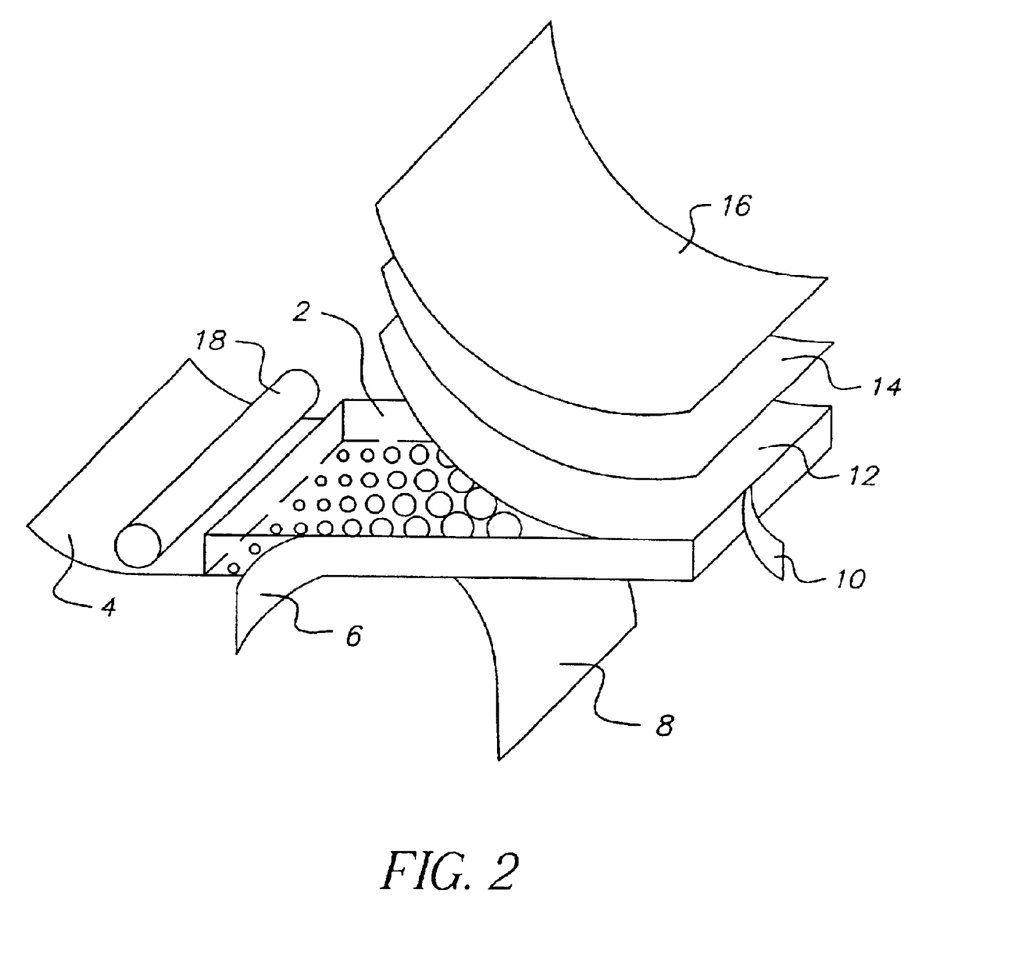
FIG. 2 illustrates a liquid crystal display device with a light diffuser.

FIG. 2 illustrates a liquid crystal display device with a light diffuser. Visible light source 18 is illuminated and light is guided into light guide 2. Lamp reflector 4 is used to direct light energy into the light guide 2, represented by an acrylic box. Reflection tape 6, reflection tape 10 and reflection film 8 are utilized to keep light energy from exiting the light guide 2 in an unwanted direction. Light diffusion film 12 in the form of a transparent polymeric film is utilized to diffuse light energy exiting the light guide in a direction perpendicular to the light diffuser. Brightness enhancement film 14 is utilized to focus the light energy into polarization film 16. The light diffusion film 12 is in contact with brightness enhancement film 14.

Polymer sheet for the transparent polymeric film comprising a plurality of convex and/or concave complex lenses on a surface thereof are generally dimensionally stable, optically clear and contain a smooth surface. Biaxially oriented polymer sheets are preferred as they are thin and are higher in elastic modulus compared to cast coated polymer sheets. Biaxially oriented sheets are conveniently manufactured by co-extrusion of the sheet, which may contain several layers, followed by biaxial orientation. Such biaxially oriented sheets are disclosed in, for example, U.S. Pat. No. 4,764,425.

Suitable classes of thermoplastic polymers for the transparent polymeric film include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Polyolefins particularly polypropylene, polyethylene, polymethylpentene, and mixtures thereof are preferred. Polyolefin copolymers, including copolymers, of propylene and ethylene as well as hexene, butene and octene are also useful. Polypropylenes are most preferred because they are low in cost and have good strength and surface properties.

Preferred polyesters for the transparent polymeric film of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. No. 2,465,319 and U.S. Pat. No. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides for the transparent polymeric film include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

Addenda is preferably added to a polyester skin layer to change the color of the imaging element. An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1–4-Bis(O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The diffuser sheets may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The diffuser sheets of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss, etc. The tacky adhesive is preferably those having a refractive index close to that of the oriented film to suppress the interfacial reflection loss of light.

The lenslet diffuser film may also be used in conjunction with another light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The lenslet diffuser film may be positioned before or after any diffuser or lens array.

The diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The transparent polymeric film of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

The diffuser sheet of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or a metal oxide or a filler.

Adhesives may be used to laminate the optical films and devices of the present invention to another film, surface, or substrate. Such adhesives include both optically clear and diffuse adhesives, as well as pressure sensitive and non-pressure sensitive adhesives. Additionally, the adhesives can contain additives such as plasticizers, fillers, antioxidants, pigments, and diffusing particles.

The lenslet diffuser film of the present invention usually has optical anisotropy. The web material and the casted thermoplastic resin are generally optically anisotropic materials exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n.*d$ since the level depends upon the application of the film.

In the manufacturing process for this invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a transparent polymeric film.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The complex lenses of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The transparent polymeric film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The lenslet diffuser film of the present invention can even the lightness of a liquid crystal display device across the display because the film has excellent light-scattering properties to expand the light to give excellent visibility in all directions. Although the above effect can be achieved even by the single use of such lenslet diffuser film, plural number of films may be used in combination. The homogenizing lenslet diffuser film may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing lenslet diffuser film of the present invention placed between the light source and the detector can eliminate from the output of the light source any trace of the filament structure and therefore causes a homogenized output which is identical from light source to light source.

The lenslet diffuser films may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of a metallic film, etc., to the lenslet diffuser film of the present invention can be used e.g. as a retroreflective member for a traffic sign. It can be used in a state applied to a car, a bicycle, person, etc.

The lenslet diffuser films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A lenslet diffuser film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The lenslet diffuser films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The lenslet diffuser films of the present invention also have significant architectural uses such as providing appropriate light for work and living spaces. In typical commercial applications, inexpensive transparent polymeric diffuser films are used to help diffuse light over the room. A homogenizer of the present invention which replaces one of these conventional diffusers provides a more uniform light output so that light is diffused to all angles across the room evenly and with no hot spots.

The lenslet diffuser films of the present invention may also be used to diffuse light illuminating artwork. The transparent polymeric film diffuser provides a suitable appropriately sized and directed aperture for depicting the artwork in a most desirable fashion.

Further, the lenslet diffuser film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The lenslet diffuser film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the transparent polymeric diffuser film is a rear projection screen, where it is generally desired to project the image from a light source onto a screen over a large area. The viewing angle for a television is typically smaller in the vertical direction than in the horizontal direction.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, and that has reduced light scattering tendencies.

The entire contents of the patents and other publications referred to in this specification are incorporated herein by reference.

EXAMPLES

In this example, multiple layered complex light diffusion lenses of the invention were created by extrusion casting three layers of extrusion grade polyolefin polymers against a pattered chill roll containing the complex lens geometry. The patterned polyolefin polymer, in the form the complex lens was then transferred to a polyester web material thereby forming a light diffuser with complex surface lenses. This example will show that multiple layered complex surface lenses formed on a transparent polymer web material provide exceptional light diffusion compared to random single polymer lenses formed on the surface of a polymer web and a prior art light diffuser utilizing a dispersion of spherical beads in an acrylic matrix. Further, it will be obvious that the light diffuser will be low in cost and have mechanical properties that allows for insertion into LC devices.

Two patterned chill rolls (complex lens and a single lens geometry) were manufactured by a process including the steps of electroplating a layer of cooper onto the surface of a roller, and then abrasively blasting the surface of the copper layer with glass beads to create a surface texture with hemispherical features. The resulting blasted surface was bright nickel electroplated to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area.

The complex lens patterned roll was manufactured by starting with a steel roll blank and grit blasted with size 14 grit at a pressure of 447 MPa. The roll was then chrome plated. The resulting complex lenses on the surface of the roll were convex. The single lens patterned roll (control) was manufactured by starting with a copper roll blank and grit blasted with size 14 spherical grit at a pressure of 310 MPa. The resulting single lenses on the surface of the roll were concave.

The base material used for both the simple lenses and the complex lenses was a 100 micrometer transparent oriented web polyester web with a % light transmission of 97.2%

The patterned chill roll containing the simple lenses was utilized to create light diffusion sheets by extrusion coating a polyolefin polymer from a coat hanger slot die comprising substantially 96.5% LDPE (Eastman Chemical grade D4002P), 3% Zinc Oxide and 0.5% of calcium stearate onto a 100 micrometer transparent oriented web polyester web with a % light transmission of 97.2%. The polyolefin cast coating coverage was 25.88 g/m$^2$.

The patterned chill roll containing the complex multiple layered lenses of the invention was utilized to create light diffusion sheets by extrusion coating the following three layers polyolefin polymer from a coat hanger slot die:
Skin Layer (Outer Most Layer):
Substantially 96.5% LDPE (Eastman Chemical grade D4002P), 3% Zinc Oxide and 0.5% of calcium stearate. The polyolefin index of refraction was 1.51 and the polymer cast coating coverage was 5.88 g/m$^2$.
Center Layer:
Commercially available syndiotactic polypropylene (Fina EOD 9502) with a density of 0.895 g/cc and an index of refraction of 1.42. The cast coating polymer coverage was 15.41 g/m$^2$.
Layer Adjacent to Base:
Substantially 96.5% LDPE (Eastman Chemical grade D4002P), 3% Zinc Oxide and 0.5% of calcium stearate. The polyolefin index of refraction was 1.51 and the polymer cast coating coverage was 5.42 g/m$^2$.

The invention materials containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The control diffusion sheet comprising randomly distributed single lenses with an average diameter of 25.4 micrometers. The structure of the cast coated diffusion sheets is as follows,
LDPE formed complex lens
Syndiotactic polypropylene formed complex lens
LDPE formed complex lens
Transparent polyester base The two diffusion sheets containing formed polymer lenses from above (invention and control) and a prior polymer light diffuser containing 8 micrometers polymer beads in an acrylic binder layer coated on a polyester web material were measured for % light transmission, % diffuse light transmission, % specular light transmission and % diffuse reflectance.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

The measured values for the invention, control and prior art materials are listed in Table 1 below.

TABLE 1

| Sample | 1<br>Invention<br>(Multi-Layered<br>Complex Lens) | 2<br>Control<br>(Single Lens) | 3<br>Control<br>(Prior Art) |
|---|---|---|---|
| Total transmission measured at 500 nm | 92.1 | 87.4 | 66.7 |
| Diffuse transmission measured at 500 nm | 89.2 | 59.0 | 65.7 |
| Spectral transmission measured at 500 nm | 2.5 | 28.4 | 1.0 |
| Diffuse reflectance measured at 500 nm | 4.6 | 5.7 | 33.3 |

As the data above clearly indicates, multi-layered complex polymer lenses formed on the surface of a transparent polymer provide excellent light diffusion and % transmission allowing for brighter liquid crystal display devices. The diffuse light transmission of 89.2% for the invention materials is significantly better than both the single lens (59.0%) and the prior art materials (65.7%). The complex lens of the invention provides significantly more curved surface area for transmitted light diffusion compared to a single lens (one curved surface) and the prior art materials (one curved surface). Diffuse light transmission is important factor in the quality of a LC device in that the diffusion sheet must mask the pattern of the light guide common to LC devices. The total light transmission of the invention of 92.1% is significantly improved over the single lens (59.0) and the prior art materials. By providing a lens that reduces internal scattering and reflection back toward the source, the invention materials allow for 92.1% of the light energy to pass through the diffuser resulting in a brighter liquid crystal display.

Because there was an index of refraction difference between the skin, middle and top layers (0.09), transmitted visible light diffusion was occurring with in the complex lens before the light reached the ambient air thus making the multiple layered complex a more efficient diffuser compared to a lens constructed of a single layer.

Integrating all of the measurements in Table 1, sample one combined high total transmission with high diffuse light transmission. This created a film that masked the pattern of the light guide while allowing most of the light through the film to enable a brighter LC display. Sample two had a high transmission value creating a bright LC display, but low diffuse transmission value so the pattern of the light guide could be seen through the display. In sample three, most of the light exiting the film was diffuse thus masking the pattern of the light guide. Though the light exiting was almost totally diffuse, the total transmission measurement was low blocking light and creating an unacceptably dark display. Light through sample three was also wasted by a large percent of reflection.

Because the invention materials were constructed of three layers, the top and bottom layers could be further modified to provide scratch resistance, adhesion to the polymer base and index of refraction differences. Further, because the invention materials were constructed on an oriented polyester base, the materials have a higher elastic modulus compared to cast diffuser sheets. The oriented polymer base of the example allow for the light diffuser to be thin and therefore cost efficient and light as the materials content of the example materials is reduced compared to prior art materials.

While this example was primarily directed toward the use of thermoplastic light diffusion materials for LC devices, the materials of the invention have value in other diffusion applications such as back light display, imaging elements containing a diffusion layer, a diffuser for specular home lighting and privacy screens, image capture diffusion lenses and greenhouse light diffusion.

Parts List

2. Light guide
4. Lamp Reflector
6. Reflection tape
8. Reflection film
10. Reflection tape
12. Transparent polymeric diffusion film
14. Brightness enhancement film
16. Polarization film
18. Visible light source
20. Base
22. Major lens
24. Bottom layer
26. Surface of base
30. Middle layer
32. Top layer
34. Minor lenses on bottom layer
36. Minor lenses on middle layer
38. Minor lenses on top layer

What is claimed is:

1. An integral diffuser film comprising a base bearing a pattern of complex lenses on a surface thereof wherein the complex lenses comprise two or more distinct layers and wherein the complex lenses have, on average, a height/diameter ratio of from 0.03 to 1.0.

2. The film of claim 1 wherein the number of distinct layers is from 2 to 11 layers.

3. The of claim 1 wherein the number of distinct layers is from 2 to 5 layers.

4. The film of claim 1 wherein the distinct layers have an index of refraction difference of between 0.02 and 0.70.

5. The film of claim 1 wherein at least two of the distinct layers have an index of refraction difference of between 0.05 and 0.20.

6. The film of claim 1 wherein at least two adjacent distinct layers have an index of refraction difference between them of between 0.05 and 0.20.

7. The film of claim 1 wherein the distinct layers have thicknesses of between 3 and 50 micrometers.

8. The film of claim 7 wherein the distinct layers have thicknesses of between 5 to 20 micrometers.

9. The film of claim 1 wherein the said distinct layers have an index of refraction difference of between 0.05 and 0.50.

10. The film of claim 1 wherein the complex lens comprises 3 layers.

11. The film of claim 10 wherein said three layers comprise a substantially thick layer having a thickness between 10 and 50 micrometers encapsulated by two thin layers having a thickness of between 3 and 8 micrometers.

12. The film of claim 1 wherein the complex lens comprises an outer layer sufficient to provide an impact resistance of the film between 0.3 and 0.85 GPa.

13. The film of claim 1 wherein the complex lens comprises an outer layer having a surface energy of between 26 and 42 dynes/cm$^2$.

14. The film of claim 1 wherein the complex lens comprises a layer adjacent to the base having a Tg of between 75 and 125 degrees C.

15. The film of claim 1 wherein the complex lens comprises a layer adjacent to the base having a peel strength to the base greater than 40 grams.

16. The film of claim 1 wherein at least one distinct layer further comprises addenda.

17. The film of claim 1 wherein the complex lenses are randomly distributed on the surface.

18. The film of claim 1 comprising complex lenses on both the top and bottom surfaces of the base.

19. The film of claim 1 wherein convex lenses are present on the top surface of the base and convex lenses are present on the bottom surface of the base.

20. The film of claim 1 wherein convex lenses are present on the top surface of the base and concave lenses are present on the bottom surface of the base.

21. The film of claim 1 wherein concave lenses are present on the top surface of the base and concave lenses are present on the bottom surface of the base.

22. The film of claim 1 wherein concave lenses are present on the top surface of the base and convex lenses are present on the bottom surface of said base.

23. The film of claim 1 wherein the complex lenses have an average frequency in any direction of between 4 and 250 complex lenses/mm.

24. The film of claim 1 wherein the complex lenses have an average frequency in any direction of between 22 and 66 complex lenses/mm.

25. The film of claim 1 wherein the complex lenses have an average width in the x and y direction of from 3 to 60 microns.

26. The film of claim 1 wherein the complex lenses have an average width in the x and y direction of from 15 to 40 microns.

27. The film of claim 1 wherein the complex lenses comprise major and minor lenses wherein the diameter of the minor lenses is on average not more than 80% of the diameter of the major lens.

28. The film of claim 27 wherein the number of minor lenses per major lens is between 2 and 60.

29. The film of claim 28 wherein the number of minor lenses per major lens is between 5 and 18.

30. The film of claim 1 wherein the complex lenses comprise minor lenses that have a width in the x and y direction of from 2 to 20 microns.

31. The film of claim 1 wherein the complex lenses comprise minor lenses that have a width in the x and y direction of from 3 to 8 microns.

32. The film of claim 1 wherein the complex lenses comprise an olefin repeating unit.

33. The film of claim 1 wherein the complex lenses comprise a carbonate repeating unit.

34. The film of claim 1 wherein the complex lenses comprise an ester repeating unit.

35. The film of claim 1 wherein the base comprises an ester repeating unit.

36. The film of claim 1 wherein the base comprises a carbonate repeating unit.

37. The film of claim 1 wherein the base comprises an olefin repeating unit.

38. The film of claim 1 wherein the base comprises a cellulose acetate.

39. The film of claim 1 wherein the diffuse light transmission is greater than 50%.

40. The film of claim 1 wherein the diffuse light transmission is at least 80%.

41. The film of claim 1 wherein the diffuse light transmission is at least 92%.

42. The film of claim 1 wherein said complex lenses are semi-spherical.

43. The film of claim 1 wherein said complex lenses are aspherical.

44. The film of claim 1 wherein said complex lenses have, on average, a height/diameter ratio of from 0.25 to 0.48.

45. The film of claim 1 wherein the number of than 250 micrometers.

46. The film of claim 1 having a thickness of from 12.5 to 50 micrometers.

47. The film of claim 1 wherein the elastic modulus of the base is greater than 500 MPa.

48. An integral diffuser film comprising a base bearing a pattern of complex lenses on a surface thereof wherein the complex lenses comprise 3 layers said three layers comprising a substantially thick layer having a thickness between 10 and 50 micrometers encapsulated by two thin layers having a thickness of between 3 and 8 micrometers.

49. The film of claim 48 wherein the distinct layers have an index of refraction difference of between 0.02 and 0.70.

50. The film of claim 48 wherein at least two adjacent distinct layers have an index of refraction difference between them of between 0.05 and 0.20.

51. The film of claim 48 wherein the complex lens layers comprise a layer adjacent to the base having a peel strength to the base greater than 40 grams.

52. The film of claim 48 wherein at least one distinct layer further comprises addenda.

53. The film of claim 48 wherein the complex lenses have an average frequency in any direction of between 4 and 250 complex lenses/mm.

54. The film of claim 48 wherein the complex lenses comprise major and minor lenses wherein the diameter of the minor lenses is on average not more than 80% of the diameter of the major lens.

55. The film of claim 48 wherein said complex lenses are aspherical.

56. An integral diffuser film comprising a base bearing a pattern of complex lenses on a surface thereof wherein the complex lenses comprise an outer layer sufficient to provide an impact resistance of the film between 0.3 and 0.85 GPa.

57. The film of claim 56 wherein the distinct layers have an index of refraction difference of between 0.02 and 0.70.

58. The film of claim 56 wherein at least two adjacent distinct layers have an index of refraction difference between them of between 0.05 and 0.20.

59. The film of claim 56 wherein the complex lens layers comprise a layer adjacent to the base having a peel strength to the base greater than 40 grams.

60. The film of claim 56 wherein at least one distinct layer further comprises addenda.

61. The film of claim 56 wherein the complex lenses have an average frequency in any direction of between 4 and 250 complex lenses/mm.

62. The film of claim 56 wherein the complex lenses comprise major and minor lenses wherein the diameter of the minor lenses is on average not more than 80% of the diameter of the major lens.

63. The film of claim 56 wherein said complex lenses are aspherical.

* * * * *

UNITED STATES PATENT AND TRADEMARK OFFICE
CERTIFICATE OF CORRECTION

PATENT NO. : 6,831,786 B2
DATED : December 14, 2004
INVENTOR(S) : Robert P. Bourdelais et al.

It is certified that error appears in the above-identified patent and that said Letters Patent is hereby corrected as shown below:

Column 21,
Lines 64 and 65, after "The" insert -- film --

Column 23,
Line 35, after "claim 1", delete "wherein the number of" and insert -- having a thickness not more --

Signed and Sealed this

Nineteenth Day of April, 2005

JON W. DUDAS
*Director of the United States Patent and Trademark Office*